(12) United States Patent
Zheng et al.

(10) Patent No.: US 8,126,847 B1
(45) Date of Patent: Feb. 28, 2012

(54) SINGLE FILE RESTORE FROM IMAGE BACKUP BY USING AN INDEPENDENT BLOCK LIST FOR EACH FILE

(75) Inventors: Ling Zheng, Saratoga, CA (US); Durga M. Arikatla, San Jose, CA (US); Vinay Hangud, San Jose, CA (US); Stephen Manley, Livermore, CA (US); Hsing Yuan, Palo Alto, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 414 days.

(21) Appl. No.: 12/113,060

(22) Filed: Apr. 30, 2008

(51) Int. Cl.
*G06F 7/00* (2006.01)
*G06F 17/00* (2006.01)
(52) U.S. Cl. ......... 707/640; 707/644; 707/645; 707/646
(58) Field of Classification Search ................... 707/674, 707/675, 676, 677, 678, 679, 680, 686, 999.204, 707/999.001, 999.202, 640, 644, 645, 646
See application file for complete search history.

(56) References Cited

U.S. PATENT DOCUMENTS

| | | | |
|---|---|---|---|
| 5,642,505 A * | 6/1997 | Fushimi ................ | 707/999.204 |
| 5,859,972 A | 1/1999 | Subramaniam et al. | |
| 5,956,725 A * | 9/1999 | Burroughs et al. .... | 707/999.101 |
| 6,993,539 B2 | 1/2006 | Federwisch et al. | |
| 7,555,620 B1 | 6/2009 | Manley | |
| 7,631,159 B1 | 12/2009 | Krishnamurthy | |
| 7,694,088 B1 | 4/2010 | Bromley et al. | |
| 7,743,028 B1 | 6/2010 | Stringham et al. | |
| 7,809,692 B1 | 10/2010 | Pruthi et al. | |
| 2003/0093439 A1 | 5/2003 | Mogi et al. | |
| 2006/0143238 A1 | 6/2006 | Tamatsu | |
| 2008/0133828 A1 | 6/2008 | Saito | |
| 2008/0243958 A1 | 10/2008 | Prahlad et al. | |
| 2009/0019362 A1 | 1/2009 | Shprigel et al. | |
| 2009/0112703 A1 | 4/2009 | Brown | |
| 2009/0125701 A1 | 5/2009 | Suponau et al. | |
| 2009/0313503 A1 | 12/2009 | Atluri et al. | |
| 2010/0077160 A1 * | 3/2010 | Liu et al. .................. | 711/162 |

OTHER PUBLICATIONS

Net App, Inc. Office Action for U.S. Appl. No. 12/391,849 mailed Feb. 24, 2009.

* cited by examiner

*Primary Examiner* — Vincent Boccio
(74) *Attorney, Agent, or Firm* — Blakely, Sokoloff, Taylor & Zafman LLP

(57) ABSTRACT

Image-based data restoration restores an entire image of a volume or selective files. A restore engine receives a request to restore data from a backup image that includes a plurality of data blocks and metadata describing attributes of the data blocks. In response to the request, the restore engine determines a restore mode. If it is determined to be a logical restore mode, the restore engine restores a file by retrieving the metadata associated with the file and the data blocks that are pointed to by the metadata. If it is determined to be an image restore mode, the restore engine restores an entire image of the volume by using the data blocks in the backup image without using the metadata.

21 Claims, 9 Drawing Sheets

| DATA BLOCK | METADATA BLOCK | METADATA BLOCK | ... | DATA BLOCK | DATA BLOCK | METADATA BLOCK | DATA BLOCK |

BACKUP IMAGE 520

Figure 5A

DATA WAREHOUSE 501 { | DATA BLOCK | ... | DATA BLOCK | METADATA BLOCK | METADATA BLOCK | ... | METADATA BLOCK | } METADATA MAP 502

BACKUP IMAGE 510

Figure 5B

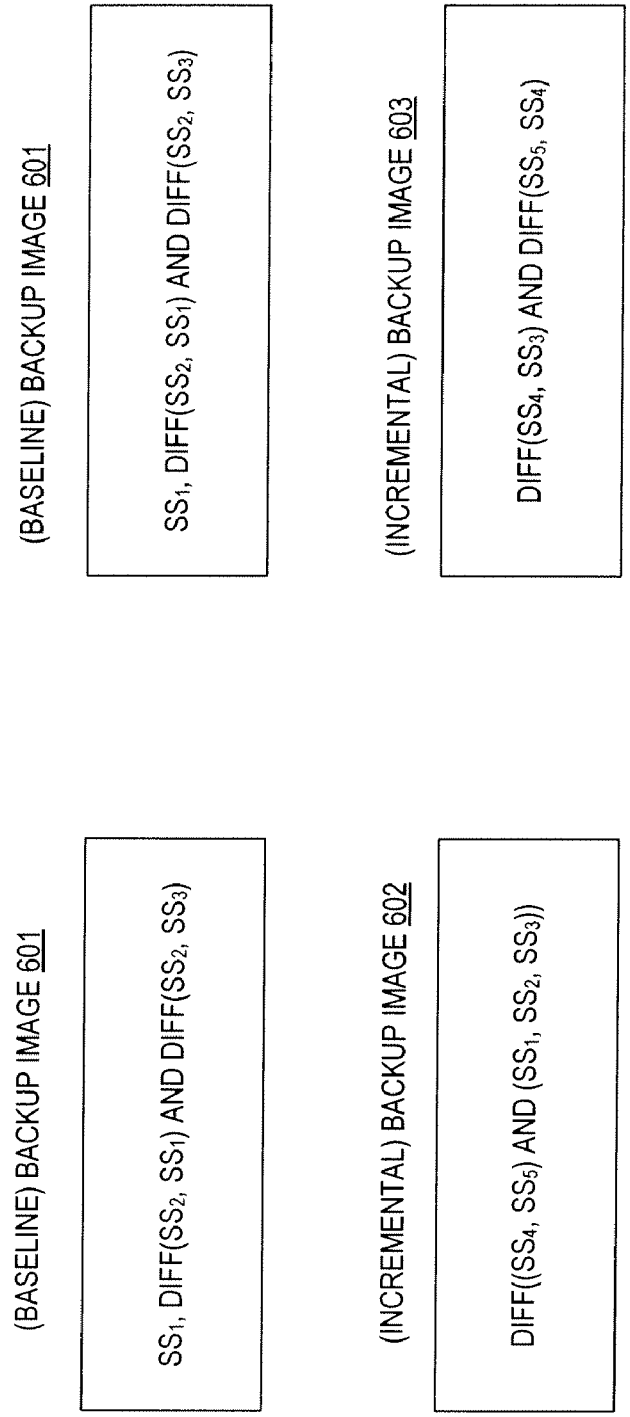

SINGLE FILE RESTORE FROM IMAGE BACKUP BY USING AN INDEPENDENT BLOCK LIST FOR EACH FILE

FIELD OF THE INVENTION

The invention in general pertains to network storage systems, and more particularly, to a storage server that manages image-based backups and restoration.

CROSS-REFERENCE TO RELATED APPLICATIONS

The present invention is related to co-filed U.S. patent application Ser. No. 12/113,049, which is assigned to the same assignee as the present application.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2007, NetApp, Inc., All Rights Reserved.

BACKGROUND

Conventionally, files and directories in a storage subsystem are backed up with file-based operations, which build individual files and directories on tapes by going through hierarchical file system structures. These conventional backup techniques generally have limited backup performance due to various file system overheads. For example, a backup operation for small files, dense directories, or fragmented file locations generally involves small reads and random disk access, which in turn incur a significant file system overhead.

Further, file-based backup techniques need to back up a file on a file-by-file basis. The files often have to be backed up in a certain order, such as inode-based ordering and directory tree based ordering. For each file, file-based backup techniques have to backup the data from the beginning to the end. The constraint imposed by the ordering limits the performance. For example, the dump format of Berkeley Software Distribution (BSD), further imposes strict ordering constraints among files, as well as data blocks of a file.

Additionally, file-based backup techniques are often unable to provide a sufficient data input rate to a tape drive, which causes a shoe-shining effect to occur. The shoe-shining effect occurs during tape reads or writes, when the data transfer rate falls below a minimum threshold at which the tape drive heads are designed to transfer data to a running tape. When the shoe-shining effect occurs, the tape drive stops, rewinds back the tape, accelerates again to a proper speed, and continues writing from the same position. The shoe-shining effect significantly reduces the backup performance.

There are additional problems with file-based backups. For example, file-based backups do not preserve metadata used by the storage system. Although a restore operation will restore user data, it cannot restore the metadata in the original volume. Loss of the metadata may result in loss of the functionality that users may have on the original volume.

SUMMARY OF THE INVENTION

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

Image-based data restoration restores an entire image of a volume or selective files. A restore engine receives a request to restore a file data from a backup image that includes a plurality of data blocks and metadata blocks describing attributes of the data blocks. In response to the request, the restore engine determines a restore mode. If it is determined to be a logical restore mode, the restore engine restores a file by retrieving the metadata associated with the file from the metadata blocks and the data blocks that are pointed to by the metadata to restore the file. The restore engine restores the file on a system with a second file system version independent of a first file system on which the backup image was generated. If it is determined to be an image restore mode, the restore engine restores an entire image of the volume by using the data blocks in the backup image without using the metadata.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 5A-5C illustrate examples of the format of a backup image.

FIGS. 6A-6B illustrate examples of backup images generated by incremental backup operations.

DETAILED DESCRIPTION

Figure 1:
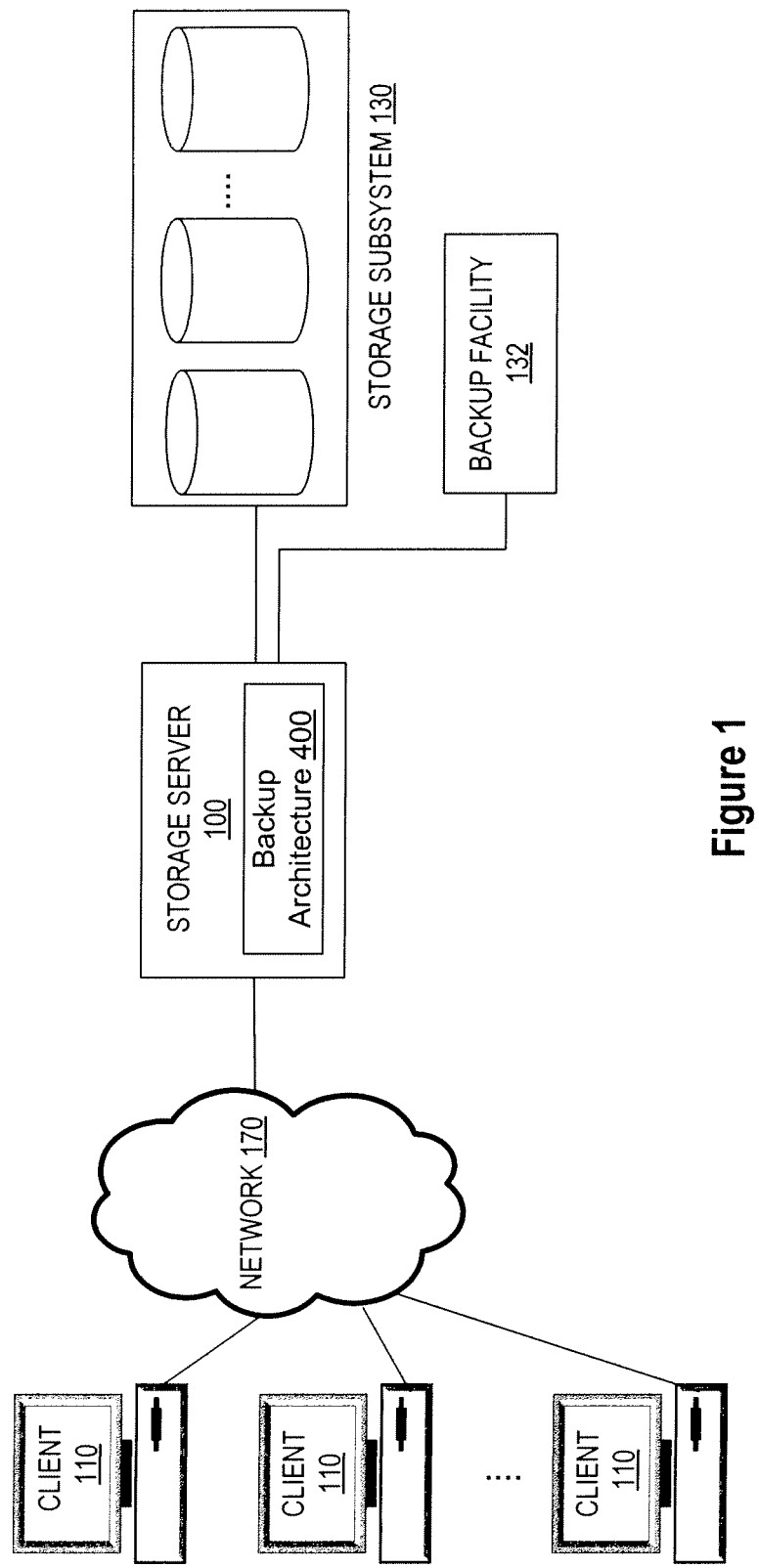
FIG. 1 illustrates a network environment which includes a storage server coupled to a storage subsystem.

Image-based data restoration is described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

Image-based data restoration restores data of a volume from one or more backup images that are created by one or more image-based backup operations. An image-based backup operation stores a backup image in backup storage using data blocks as a basic backup unit. A data block may be a block of a file or a directory. The backup image is designed to support time-efficient backup operations as well as space-efficient backup storage. With respect to time efficiency, the data blocks can be stored without any ordering constraints imposed on the data blocks. With respect to space efficiency, all of the in-use data blocks in a volume (the term "volume"

will be explained in greater detail below) are backed up without duplicating common data blocks. Further, the data blocks and metadata of the data blocks are read and stored with low-level disk I/O operations that incur minimal overhead, without using file system operations (illustratively, file open, directory read, etc).

In one aspect, the image-based data restoration supports several restore modes. The restore modes include an image restore mode that supports restoration of an entire image of the volume and is file system version dependent. The restore modes also include a logical restore mode that allows data to be restored into different file system versions and different file system types. Thus, the logical restore mode allows file system independent restoration. The logical restore mode supports restoration of one, multiple, or entire files and directories of a volume. With the logical restore mode, selective one or more files can be restored from a backup image without restoring the entire image. Further, one or more files can be restored from a backup image even if some tape blocks are unreadable.

Each backup operation creates a backup image that includes one or more point-in-time images (hereinafter "snapshots") of a volume in a storage subsystem. Backing up multiple snapshots in one backup operation increases the efficiency of the backup performance. The backup is performed on a block-by-block basis. To reduce storage space, common data blocks of the snapshots are not duplicated in the backup image. In one embodiment, a backup image includes one or more snapshots with all of the data blocks. Alternatively, a backup image may include selective snapshots as determined by a user of the storage system, such as a system administrator.

Before further discussing details of the image-based data restoration, it is useful to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs.

To keep track of the organization of blocks stored in an aggregate, a storage server maintains various hierarchical data structures, called buffer trees. A buffer tree may represent, for example, a volume defined within an aggregate, or a file or a directory defined within a volume. The root of the buffer tree is known as an "inode", which is a metadata structure (or equivalently, a metadata container) that contains metadata about the file or the directory. The metadata may include information about the type (e.g., regular, directory) the file/directory, the size of the file/directory, time stamps (e.g., access and/or modification time), and ownership of the file/directory. A directory inode contains a list of filenames and the corresponding inode numbers of those files having the filenames. A file inode contains a list of disk block numbers that identify the data blocks owned by the corresponding file. The use of data blocks and inodes to create a backup image will be described in greater detail with reference to FIGS. 5 and 6.

FIG. 1 shows an example of a network environment in which a storage server 100 operates. The storage server 100 can be a file server or "filer," in which the image-based backup described herein can be implemented. It should also be noted that the image-based backup described herein can be applied in other types of storage systems, such as storage servers, which provide clients with either or both of block-level access and file-level access to stored data or processing systems other than storage servers, and network devices configured to provide storage services.

Referring to FIG. 1, the storage server 100 includes a backup architecture 400, which will be described in greater detailed in connection with FIG. 4, for creating and restoring a backup image. The storage server 100 is coupled to a storage subsystem 130 which includes an array of mass storage devices (e.g., disks), and to backup storage 132 (e.g., tapes). The storage server 100 is also coupled to storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server 100. The storage server 100 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, the storage server 100 may have a distributed architecture; for example, it may include a separate N- ("network") module and D- ("data") module (not shown). In such an embodiment, the N-module is used to communicate with clients 110, while the D-module includes the file system functionality and is used to communicate with an associated one of the storage subsystems 130. The N-module and D-module can communicate with each other using an internal protocol. Alternatively, the storage server 100 may have an integrated architecture, where the network and data components are all contained in a single box. The storage server 100 may also be coupled through a switching fabric to other similar storage servers (not shown) which have their own local storage subsystems. In this way, all of the storage subsystems 130 can form a single storage pool, to which any client of any of the storage servers has access.

Illustratively, the storage server 100 may be a storage server product of NetApp Inc., Sunnyvale, Calif., that uses the NetApp® Data ONTAP® storage operating system. However, it is expressly contemplated that any appropriate storage server and storage operating system may be enhanced for use in accordance with the image-based backup described herein.

Figure 2:
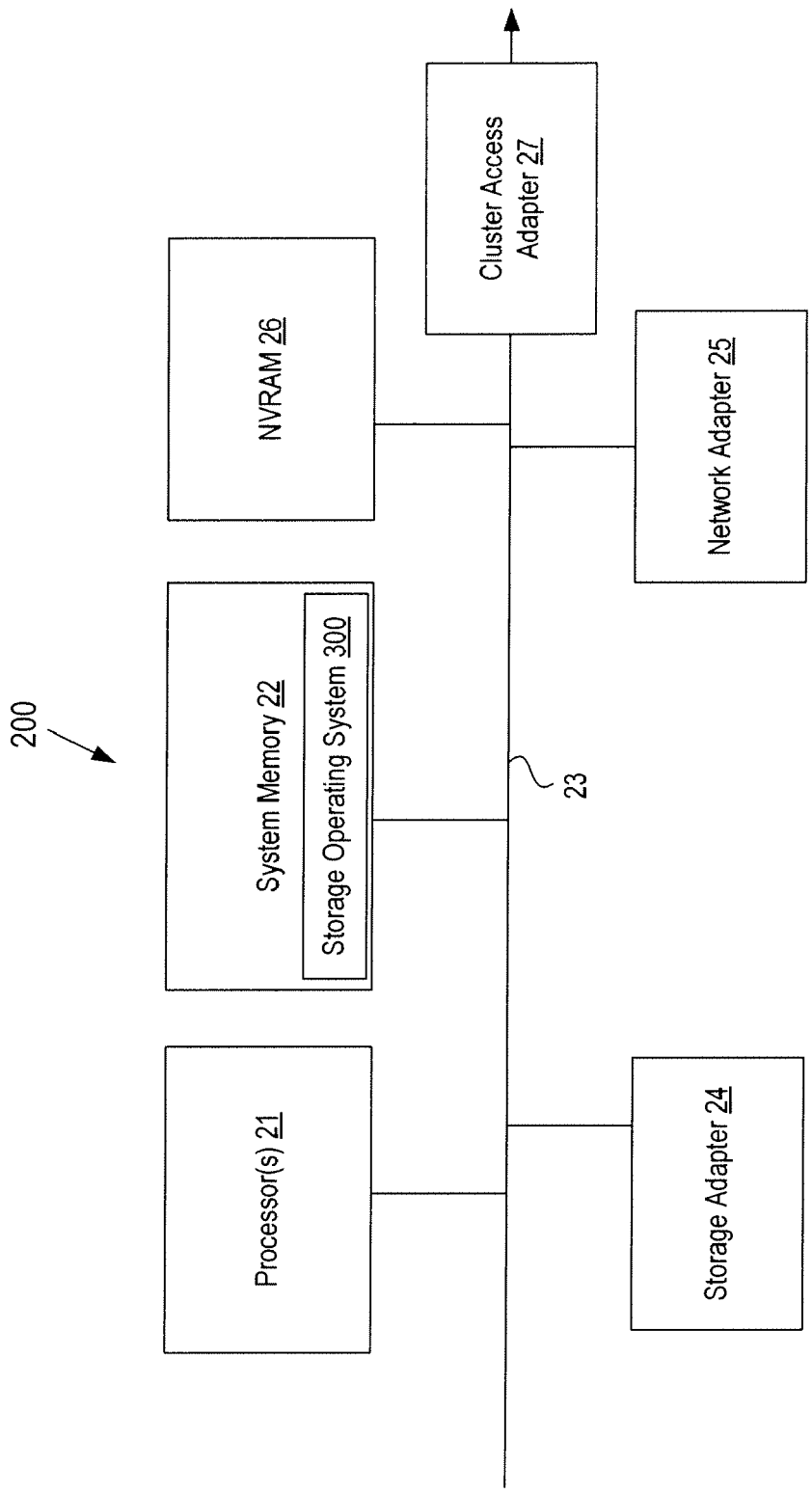
FIG. 2 illustrates an example of the hardware architecture of a storage server.

FIG. 2 is a block diagram 200 showing an example of the architecture of the storage server 100 at a high level. Certain standard and well-known components, which are not germane to the present invention, are not shown. The storage server 100 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus (such as PCI, PCI-X or PCI Express), HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the storage server 100 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory (i.e., the "system memory") of the storage server 100. Memory 22 represents any form of random access memory (RAM), read-only memory (ROM), flash memory, or the like, or a combination of such devices. Memory 22 stores (among other things) a storage operating system 300, which can implement the image-based backup and restoration described herein.

Also connected to the processors 21 through the bus system 23 are a storage adapter 24, a network adapter 25 and a cluster access adapter 27. The storage adapter 24 allows the storage server 100 to access the storage subsystem 130 of FIG. 1, and may be, for example, a Fibre Channel adapter or a SCSI adapter. The network adapter 25 provides the storage server 100 with the ability to communicate with remote devices, such as the clients 110, over a network and may be, for example, an Ethernet adapter, a Fibre Channel adapter, or the like. The cluster access adapter 27 couples the storage server 100 to other nodes of the cluster over a cluster switching fabric. In some embodiments, the cluster access adapter 27 connects to other nodes of the cluster through an InfiniBand connection.

The storage server 100 also includes non-volatile random access memory (NVRAM) 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array. In some embodiments, the NVRAM 26 and the system memory 22 may not have a direct connection to the bus system 23, but may be accessible through other components (e.g., the processor 21) to the bus system 23.

Figure 3:
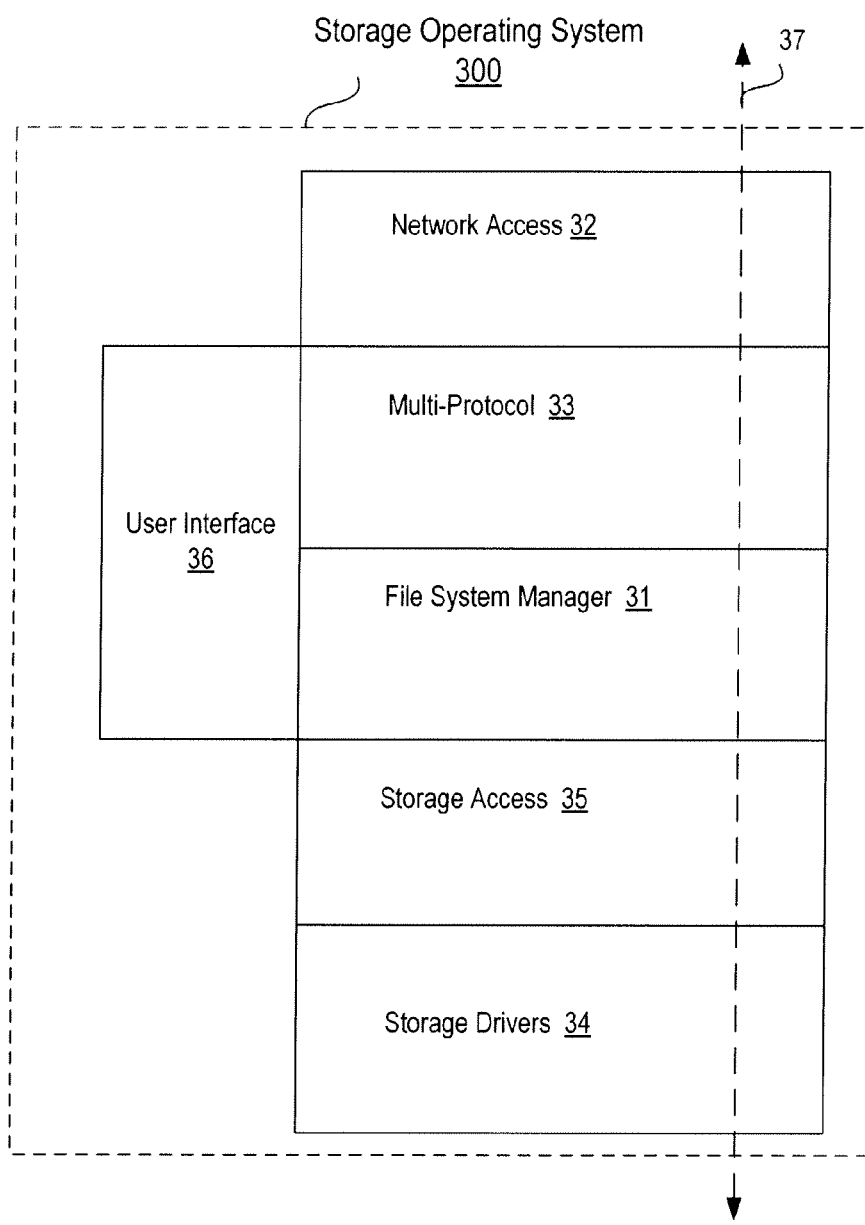
FIG. 3 illustrates the architecture of an operating system of the storage server according to an embodiment of the invention.

FIG. 3 illustrates an example of the storage operating system 300 for controlling the operations of the storage server 100. The storage operating system 300 and its constituent elements are preferably implemented in the form of software. However, in some embodiments, some or all of the elements of the operating system may be implemented in the form of hardware (e.g., specially designed circuitry), or as a combination of hardware and software.

As shown, the storage operating system 300 includes several modules, or "layers". These layers include a file system manager 31. The file system manager 31 is software that manages the one or more file systems managed by the storage server 100. In particular, the file system manager 31 imposes a hierarchy (e.g., a directory/file structure) on the data stored in the storage subsystem 130 and manages client-initiated read and write operations at a high level (while delegating certain functions to lower layers of the storage operation system 300).

To allow the storage server 100 to communicate over the network 170 (e.g., with clients 110), the storage operating system 300 also includes a network access layer 32, and a multi-protocol layer 33 operatively coupled between the file system manager 31 and the network access layer 32. The multi-protocol layer 33 includes a number of higher-level network protocols, such as Network File System (NFS), Common Internet File System (CMS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage 100 to communicate with the storage subsystem 130, the storage operating system 300 includes a storage driver layer 34, and a storage access layer 35 operatively coupled between the file system manager 31 and the storage driver layer 34. The storage access layer 35 implements a higher-level disk storage protocol, such as RAID-4, RAID-5 or RAID-DP, while the storage driver layer 34 implements a lower-level storage device access protocol, such as Fibre Channel Protocol (FCP) or SCSI. The storage access layer 35 is alternatively called the "RAID layer" in this description.

Also shown in FIG. 3 is the path 37 of data flow, through the storage operating system 300, associated with a client-initiated read or write request.

The storage operating system 300 also includes a user interface 36 to generate a command line interface (CLI) and/or graphical user interface (GUI), to allow administrative control and configuration of the storage server 100, from a local or remote terminal.

Figure 4:
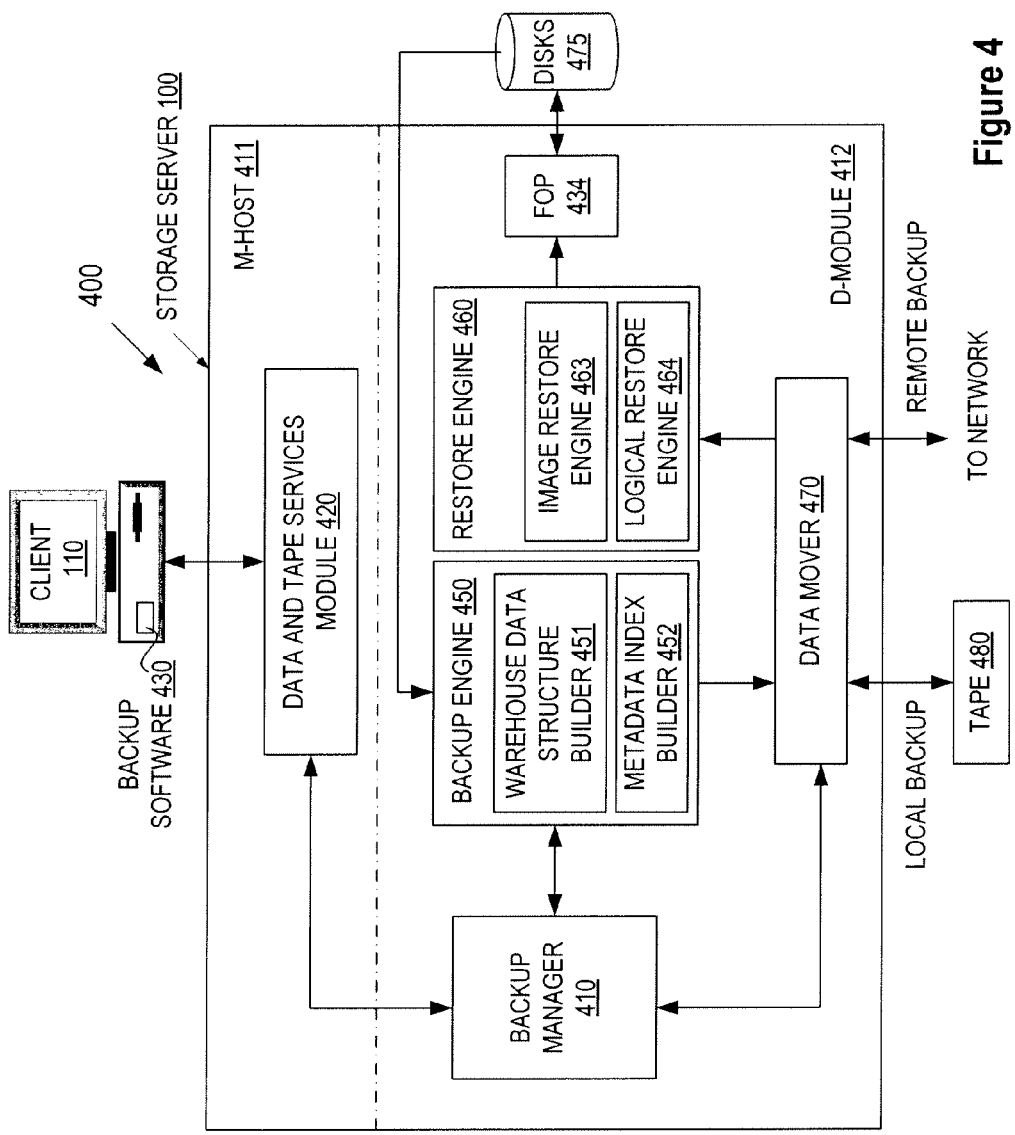
FIG. 4 illustrates an example of a backup architecture for backing up images of a volume serviced by the storage server.

FIG. 4 illustrates an embodiment of a backup architecture 400 for implementing the image-based backup described herein. Components that are not germane to the purpose of the discussion are not shown. The backup architecture 400 may be implemented by hardware (e.g., circuitry, dedicated logic, programmable logic, microcode, etc.), software (such as instructions run on a processing device), or a combination thereof. In one embodiment, the backup architecture 400 may be located on one or more storage servers 100, and implemented by the components of the storage operating system 300. In the embodiment shown in FIG. 4, the backup architecture 400 includes an M-host 411 and a D-module 412. The M-host 411 is an application that may be located on a host separate from the storage server 100; or, in the embodiment as shown, located on the storage server 100. In the embodiment of FIG. 4, the M-host 411 interacts with the storage operating system 300 to provide a user space environment for accessing data in a local node and cluster nodes. The D-module 412 manages the storage subsystem 130 of a local node, and can be implemented by the storage driver layer 34 of the storage operating system 300.

Referring to FIG. 4, a data and tape services module 420 interfaces with users or client-side backup software 430 to configure and manage the backup environment. The data and tape services module 420 may be part of the M-host 411 or a module separate from the M-host 411. In one embodiment, the data and tape services module 420 operates in accordance with the Network Data Management Protocol (NDMP), which is an open standard protocol for enterprise-wide backup of heterogeneous network-attached storage. The conventional NDMP is designed to support file-based backups only. The backup architecture 400 can work with the NDMP to provide image-based backups through the NDMP. The data and tape services module 420 provides an interface at the server side to communicate with the client-side backup software 430. The data and tape services module 420 also forwards client-side requests to the D-module 412 to perform requested backup or restore operations.

The D-module 412 may include a backup engine 450 for generating image backup data streams, and a restore engine 460 for restoring the backup data from tapes 480. A data mover 470 interfaces with both the backup engine 450 and the restore engine 460 to perform tape I/O operations. The data mover 470 may interact with the tapes 480 that are locally connected to the storage server 100, or remote backup storage via a network. The D-module 412 may also include a backup manager 410, which coordinates backup operations of the client 110, the data and tape services module 420, the backup engine 450, the restore engine 460 and the data mover 470. Further, the backup manager 410 can be configured to coordinate backup operations in a cluster environment, where one or more of the components of the backup architecture 400 reside on separate storage servers.

When a client sends a request to backup a volume, the backup engine 450 generates a backup image, in one backup operation, that includes all of the point-in-time images ("snapshots") of a volume that are currently stored ("in use") in the storage subsystems 103, or one or more snapshots selected by the client. The backup engine 450 may retrieve data from disks 475 through one or more layers of the storage operating system 300, such as the file system manager 31 and the storage access layer 35. In one embodiment, the backup engine 450 includes a warehouse data structure builder 451 and a metadata index builder 452 to construct a backup image for a volume. The warehouse data structure builder 451 of the backup engine 450 retrieves data blocks from the disks 475, and stores the data blocks in a backup image. The metadata index builder 452 retrieves metadata of the data blocks from the disks 475 and stores the metadata in the backup image. The metadata provides the logical restore engine 464 of the restore engine 460 with the ability to restore the entire image or selectively restore one or more files from the volume, by restoring one file at time. Alternatively, a client may request the restoration of an entire image of the volume. Image restoration is supported by the image restore engine 463, which uses only the data blocks of the backup image.

In one embodiment, the restore engine 460 includes an image restore engine 463 for restoration of an entire image of a volume that is file system version dependent. Thus, the image restore engine 463 may only restore a backup image on certain file system versions. Illustratively, if a backup is performed on a system with a file system version X, the image restoration may only be performed on a system with the same file system version X. The image restored by the image restore engine 463 includes all of the blocks in a volume, such as user data and system metadata, and preserves the block layout of the volume. As some system metadata (such as configuration data of the storage operating system 300, features of the data blocks, etc.) is tied to the block layout, the restored image allows the system metadata to continue to function after restoration. The restore engine 460 also includes a logical restore engine 464 for restoration of one, multiple, or entire files and directories of a volume that are file system version independent. Thus, the logical restore engine 464 can perform restoration on a system with any file system version as long as the system supports image-based backup and restore features. However, the logical restore engine 464 changes the block layout, and is, therefore, unable to recover some of the system metadata.

In one embodiment, the restore engine 460 saves the restored data in the disks 475 via a file operation module (FOP) 434. The FOP module 434 receives requests from the restore engine 460, generates actions according to the requests, and transforms the actions into file system messages that restore directories and files and save them into the disks 475. Operations of the restore engine 460 and the file operation module 434 will be described in greater detail below in connection with FIG. 8.

Figure 5C:
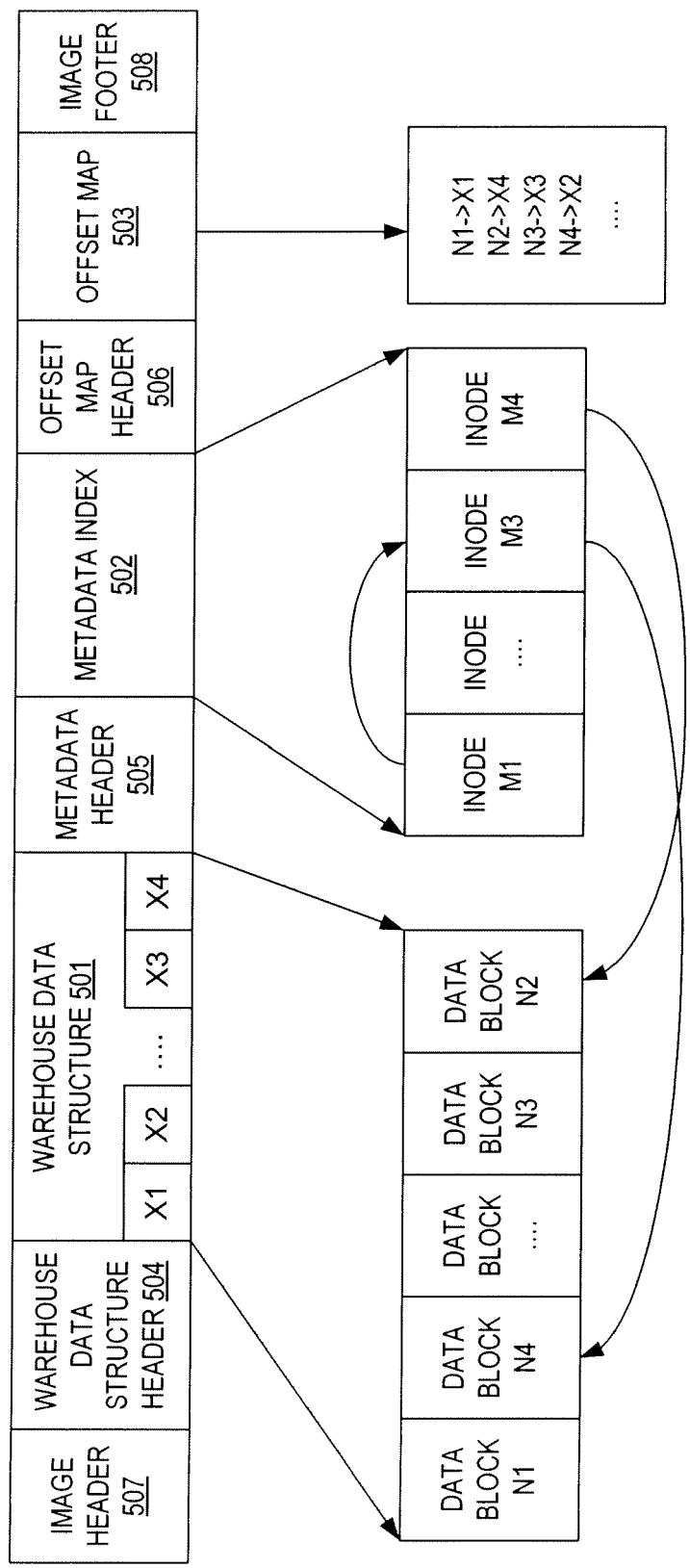

FIGS. 5A-5C show examples of a backup image at a high level. As will be described in greater detail below, the backup image has a structure that can be efficiently generated during backup. The backup image does not retain the buffer tree structure of a volume, as in the storage subsystem 103. Instead, the backup image contains a collection of data blocks and metadata blocks. The data blocks are simply a raw image of the volume. The metadata blocks contain pointers that inter-relate the data blocks.

Referring to FIG. 5A, in one embodiment, a backup image 520 includes a number of data blocks intermixed with a number of metadata blocks. The data blocks include the data blocks that constitute one or more snapshots of a volume, and the metadata blocks include the corresponding metadata of the data blocks. The data blocks and metadata blocks are stored in any order convenient for a backup operation, without any ordering constraints. Illustratively, a data block (or a metadata block) for a more recent snapshot may be stored before or after another data block (or another metadata block) of an older snapshot. In one embodiment, the data blocks and metadata blocks are stored in the backup image 520 in the same order as they are retrieved from disks. The order in which the data blocks and metadata blocks are retrieved from the disks can be determined by the backup engine 450 that is most time efficient. Referring to FIG. 5B, in another embodiment, a backup image 510 includes a first section, referred to as a warehouse data structure 501, for storing data blocks of a volume. The backup image 510 also includes a second section, referred to as a metadata index 502, for storing the corresponding metadata of the data blocks. Within each of the first and the second sections, the data blocks and the metadata blocks can be stored in any order without any ordering constraints. Alternatively, either or both of the data blocks and the metadata blocks can be stored according to a given order, such as the order of snapshots, disk block numbers, or the like. In a scenario where the data blocks and/or the metadata blocks are ordered by snapshots, it is unnecessary to impose any ordering constraints within each of the snapshots. The backup images 510 and 520 may include additional sections, such as header and footer, as well as other sections not germane to the purpose of the discussion herein.

In yet another embodiment shown in FIG. 5C, a backup image 500 includes the warehouse data structure 501, the metadata index 502, an offset map 503, and additional sections 504-508, which will be described in more detailed later. The offset map 503 records the offset of every data block in the warehouse data structure 501 to speed up data retrieval at restore time.

In the embodiments shown in FIGS. 5A-5C, each data block is identified by a disk block number. The disk block number is the identifier of the data block in the storage subsystem 103 (e.g., disks) of FIG. 1. Each data block has a fixed size, e.g., 4 kilobytes. These data blocks constitute one or more snapshots of the volume. The snapshots may include all of the snapshots of the volume that are currently stored in the storage subsystem 103, or one or more specific snapshots selected by a client. In the embodiments of FIG. 5A and FIG. 5B where the data blocks are not ordered by snapshots, each data block may includes a snapshot identifier to identify its membership in a snapshot.

The metadata blocks of FIGS. 5A-5C provide the necessary metadata to locate and restore individual directories and files. In one embodiment, each metadata block includes an Mode, such as a directory Mode or a file Mode. Each Mode has an identification number (an Mode number) and associated attributes including the type of mode (such as a directory Mode or a file mode). A directory Mode contains a list of filenames and the corresponding mode numbers of those files having the filenames. A file Mode contains a list of disk block numbers that identify the data blocks owned by the corresponding file. The metadata blocks are a logical representation of a file system structure and, therefore, are independent of on-disk file system format. In the embodiments of FIG. 5A and FIG. 5B where the metadata blocks are not ordered by snapshots, each metadata block may includes a snapshot identifier to identify its membership in a snapshot. Further, in the embodiments of FIGS. 5A-5C, the computation of the metadata blocks and the writing of data blocks to a backup image can be executed concurrently to speed up the backup process.

The backup images described above do not include any data blocks that are common to any of the snapshots. Only the data blocks that have been changed since an immediate-preceding snapshot are stored in the backup image. Thus, there is no duplication of data blocks in a backup image. With respect to metadata blocks, in one embodiment, only the metadata blocks corresponding to the data blocks in the same backup image are stored, and, therefore, there is also no duplication of the metadata blocks in the backup image. In an alternative embodiment, the metadata blocks for each of the backed up snapshots are stored in their entirely for increased speed during data restoration.

Referring again to FIG. 5C, the backup image 500 also includes a warehouse data structure header 504, a metadata header 505 and an offset map header 506 to mark the beginning of each of the three sections (the warehouse data structure 501, the metadata index 502 and the offset map 503). The backup image 500 further includes an image header 507 and an image footer 508 to mark the beginning and end of the backup image 500. In one embodiment, the image header 507 contains per volume attributes, such as volume language, density, and the like. The image footer 508 contains key summary information of the backup image 500, such as addresses of the metadata index 502 and the offset map 503 within the backup image 500.

The offset map 503 of the backup image 500 records the offset of every data block in the warehouse data structure 501. Illustratively, the offset map 503 includes a list that relates the disk block number of a data block to an offset of the data block in the backup image 500. Illustratively, the offset can be the number of bytes between the beginning of the data block and the beginning of the warehouse data structure 501. The offset map 503 improves the speed of file restoration. During restore time, the restore engine 460 can take a file inode, identify the list of disk block numbers belonging to the corresponding file, and use the offset map 503 to locate those data blocks having the identified disk block numbers. With the use of the offset map 503, it becomes unnecessary for the restore engine 460 to scan the warehouse data structure 501 to look for specific data blocks.

Backup operations can be performed incrementally. For example, a backup operation can be followed by one or more incremental backup operations. Each incremental backup operation generates an incremental backup image, in which only incremental changes from the previous backup operation are stored. FIGS. 6A and 6B show examples of backup images 601-603 that are generated by the backup engine 450 of FIG. 4 in two consecutive backup operations. The backup image 601 is generated as a baseline backup (which is also referred to as a level-0 backup), and the backup images 602 and 603 are generated as incremental backups (which are also referred to as level-1 backups). Illustratively, the backup image 601 includes the data blocks and metadata blocks of three snapshots $SS_1$, $SS_2$, $SS_3$, without duplication of any common data blocks. In one embodiment, the backup image 601 stores the entire data blocks of snapshot $SS_1$, the difference (shown in FIGS. 6A and 6B as "diff") between $SS_2$ and $SS_1$, and the difference between $SS_3$ and $SS_2$. The backup images 602 and 603 include the data blocks and metadata blocks of two snapshots $SS_4$, $SS_5$. In the embodiment of FIG. 6A, the backup image 602 is generated by computing the difference between snapshots ($SS_4$, $SS_5$) and snapshots ($SS_1$, $SS_2$, $SS_3$) with respect to data blocks and metadata blocks in these snapshots. In the embodiment of FIG. 6B, the backup image 603 is generated by computing the difference between snapshots $SS_4$ and $SS_3$, and the difference between $SS_5$ and $SS_4$, with respect to data blocks and metadata blocks. The metadata blocks in the incremental backup images 602 and 603 may also include the parent directories of the files and directories that have been updated since a last backup operation to allow reconstruction of the full pathname of the updated files and directories.

This incremental storage of snapshots and metadata greatly reduces backup storage space at the expense of a slight increase in overhead during data restoration time.

In one embodiment, the image-based backup described herein preserves deduplication, compression and encryption properties of the data. That is, if the source data is deduplicated, compressed or encrypted, the backup data on tape will be stored in the same form. For example, a shared block in a deduplicated volume will be backed up only once in the warehouse data structure 510, therefore making backup efficient for disk reads and tape writes. In addition, the backup image on tape will use less space than it would otherwise, just as with the original volume. Similarly, compressed or encrypted blocks will be read without being decompressed or decrypted when being backed up in the warehouse data structure 510.

Figure 7:
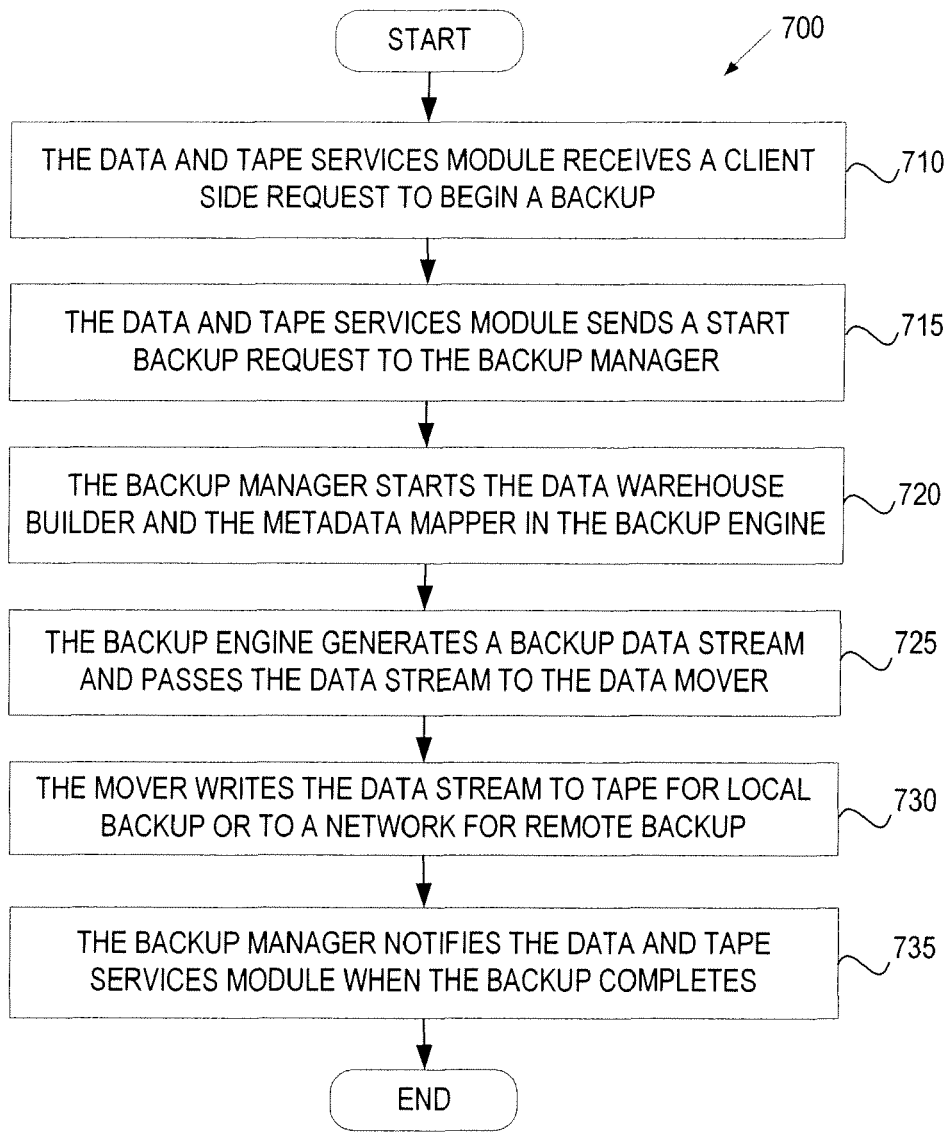
FIG. 7 is a flow diagram illustrating an embodiment of a process of a backup operation.

FIG. 7 is a flowchart illustrating a process 700 for performing an image-based backup operation in accordance with an embodiment of the present invention. Details not germane to the present invention are omitted from the following description. At block 710, the data and tape services module 420 receives a client-side request to begin a backup operation for a volume. In response to the request, at block 715, the data and tape services module 420 sends a start backup request to the backup manager 410. At block 720, the backup manager 410 starts the warehouse data structure builder 451 and the metadata index builder 452, which, at block 725, generates a backup data stream and passes the data stream to the data mover 470. In some embodiments, the backup engine 450 also sends file history information during the backup operation to the requesting client 110. At block 730, the data mover 470 writes the data to tapes 480 for local backup, or to networked storage for remote backup. The backup manager 410 notifies the data and tape services module 420 when the backup operation completes at block 735.

Figure 8:
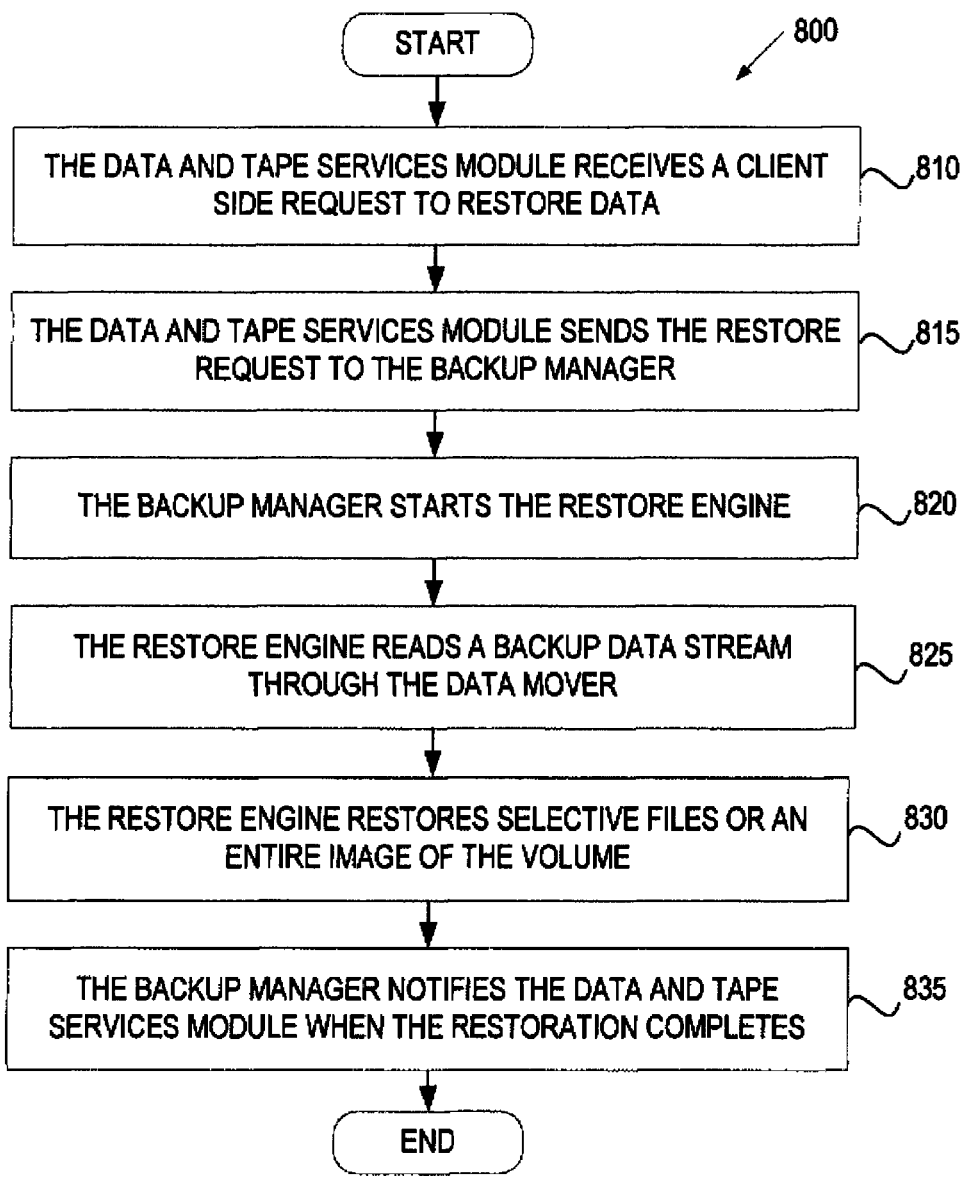
FIG. 8 is a flow diagram illustrating an embodiment of a process of a restore operation.

FIG. 8 is a flowchart illustrating a process 800 for performing a restore operation in accordance with an embodiment of the present invention. Details that are not germane to the purpose of this disclosure are herein omitted. At block 810, the data and tape services module 420 receives a client-side restore request. In some embodiments, prior to sending the restore request, the requesting client 110 may request the data and tape services module 420 to send file history information for determining the data to be restored. Based on the file history information, the requesting client 110 may determine to restore the entire image of the volume including one or more snapshots, or one or more specific snapshots, or one or more specific files or directories within a snapshot. At block 815, the data and tape services module 420 sends the restore request to the backup manager 410. At block 820, the backup manager 410 starts the restore engine 460. At block 825, the restore engine 460 reads the backup data stream through the data mover 470. Depending on the type of restore request received at block 810, the restore engine 460 performs restore operation at block 830.

With respect to restoration of an image, the restore engine 460 restores the data blocks of a backup image into a destination target volume. After all the data blocks are restored, the restore engine 460 activates the restored data for use by the storage server 100. As mentioned above, image restoration does not involve the use of metadata, and is, therefore, faster than restoration of files and directories.

With respect to restoration of file and directories, the restore engine 460 uses the FOP modules 434 to handle directories and files, as well as I/O operations. The restore engine 460 generates FOP requests for directories and files to be restored, and sends the FOP requests to the FOP modules 434. Each FOP request may have multiple actions, such as create a directory or file, populate data, set attributes, and the like. Each of these actions is executed by the FOP module 434. The FOP module 434 transforms the actions into file system messages, and sends the messages to the file system asynchronously. "Asynchronously" means that file operations are not blocked when sending out file system messages. When replies from the file system are received by the FOP module 434, the FOP module 434 checks for errors and performs a next action, if any, in the current FOP request until all of the outstanding actions are handled.

When the restore operation completes, the backup manager 410 notifies the data and tape services module 420 at block 835.

When restoring a single file, the logical restore engine 464 uses the metadata in a backup image to find the inode number of the file from its directory inode, locates the file's inode by the inode number, determines the list of disk block numbers contained in the inode, and then accesses the backup image to retrieve the data blocks identified by the disk block numbers. When restoring a single file that was backed up with both level-0 (baseline) and level-1 (incremental) backup operations, the logical restore engine 460 first constructs a file from a baseline backup image, and then updates the file using one or more incremental backup images. Alternatively, the logical restore engine 464 first identifies all the data blocks it needs to restore from different backup images based on the metadata index, and then restores the data blocks as necessary. Illustratively, a file with two data blocks (b1, b2) is backed up in a baseline backup, and then one of the data blocks (b2) is modified and backed up in an incremental backup. When restoring the file, the logical restore engine 464 restores b2 from the incremental backup image and b1 from the baseline backup image. In this example, the restore engine 464 does not need to restore both blocks (b1, b2) from the baseline backup.

Thus, image-based data restoration has been described. Software to implement the image-based backup described herein may be stored on a computer-readable storage medium. A "computer-readable storage medium", as the term is used herein, includes any mechanism that stores information in a form accessible by a computer (e.g., a desktop computer, a laptop computer, a network computing device, a personal digital assistant (PDA), a manufacturing tool, any device with a set of one or more processors, etc.). For example, a computer-readable storage medium includes recordable/non-recordable media (e.g., read-only memory (ROM); random access memory (RAM); magnetic disk storage media; optical storage media; flash memory devices; etc.), and the like, such as the system memory 22 of FIG. 2.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
    receiving a request to restore data from a backup image of a volume generated on a system having a first file system type, the backup image including a plurality of data blocks and a plurality of metadata blocks, each metadata block pointing to a corresponding one of the data blocks and describing attributes of the corresponding data block, the first file system type having the data blocks and the metadata blocks intermixed in the backup image and organized independently of when the backup image was generated;
    determining a restore mode in response to the request;
    in response to a first determination of a logical restore mode, restoring a file in the volume by retrieving the metadata blocks associated with the file and the data blocks that are pointed to by the retrieved metadata blocks;
    wherein the file is restored on a system with a second file system type independent of, and different from, the first file system type, the second file system type has a different data layout and format than the first file system type, the second file system type having the data blocks stored in a different section of the backup image from the metadata blocks; and
    in response to a second determination of an image restore mode, restoring an entire image of the volume by using the data blocks in the backup image without using the metadata blocks.

2. The method of claim 1, wherein retrieving the metadata blocks further comprises:
    identifying the data blocks pointed to by the metadata blocks using disk block numbers stored in the metadata blocks.

3. The method of claim 1, wherein the data blocks are stored in the backup image without an ordering constraint imposed on the data blocks.

4. The method of claim 1, wherein restoring the entire image of the volume further comprises:
    restoring the entire image according to the first file system type.

5. The method of claim 4, further comprising:
maintaining a block layout of the entire image of the volume that is restored.

6. The method of claim 1, wherein restoring the file further comprises:
restoring an incremental change of the file from an incremental backup image; and
restoring the file from the backup image and the incremental change,
wherein the incremental backup image and the backup image do not have common data blocks.

7. The method of claim 1, further comprising:
reading the backup image from backup storage; and
writing a Network Data Management Protocol (NDMP) data stream that contains the file.

8. A storage system comprising:
backup storage to store a backup image of a volume generated on a system having a first file system type, the backup image including a plurality of data blocks and a plurality of metadata blocks, each metadata block pointing to a corresponding one of the data blocks and describing attributes of the corresponding data block, the first file system type having the data blocks and the metadata blocks intermixed in the backup image and organized independently of when the backup image was generated; and
a storage server coupled to the backup storage, the storage server to include:
a restore engine to retrieve the metadata blocks associated with the file and the data blocks that are pointed to by the retrieved metadata blocks, and to restore the file on a system with a second file system type independent of and different from the first file system type, wherein the second file system type has a different data layout and format than the first file system type, the second file system type having the data blocks stored in a different section of the backup image from the metadata blocks.

9. The storage system of claim 8, wherein the restore engine further comprises:
a logical restore engine to restore the file and directories; and
an image restore engine that restores an entire image of the volume including the data blocks, wherein the image restore engine restores the entire image according to the first file system type.

10. The storage system of claim 8, wherein the image restore engine uses the data blocks in the backup image to restore an entire image of the volume without the use of the metadata blocks.

11. The storage system of claim 8, wherein the data blocks are stored in the backup image without an ordering constraint imposed on the data blocks.

12. The storage system of claim 8, wherein the storage server further comprises:
a data and tape services module to read from the backup storage and to write an Network Data Management Protocol (NDMP) data stream that contains the file.

13. The storage system of claim 8, further comprising:
a data mover to transfer the backup image from local backup storage and remote backup storage to the restore engine.

14. A computer-implemented method comprising:
reading one or more disk block numbers from a metadata container of a file in a backup image of a volume generated on a system having a first file system type, the backup image including a plurality of data blocks and a plurality of metadata blocks, each metadata block pointing to a corresponding one of the data blocks and describing attributes of a corresponding data block, the first file system type having the data blocks and the metadata blocks intermixed in the backup image and organized independently of when the backup image was generated; and
restoring the file by retrieving the metadata blocks associated with the file and the data blocks that are pointed to by the retrieved metadata blocks, the file restored on a system with a second file system type independent of and different from the first file system type, wherein the second file system type has a different data layout and format than the first file system type, the second file system type having the data blocks stored in a different section of the backup image from the metadata blocks.

15. The method of claim 14, further comprising:
sending file history information to a client in response to a restore request from the client; and
receiving a determination to restore at least one of the following: an entire image of the volume, a selected file, and a selected directory.

16. The method of claim 14, further comprising:
preserving a data property of the volume in the backup image, the data property including one or more of data deduplication, data compression and data encryption.

17. The method of claim 14, further comprising:
restoring a baseline of the file using the backup image in a first restore operation; and
updating the baseline of the file using an incremental backup image in a second restore operation, wherein the incremental backup image and the backup image do not have common data blocks.

18. The method of claim 14, wherein the data blocks within the backup image are stored without an ordering constraint imposed on the data blocks.

19. The method of claim 14, wherein restoring the file further comprises:
identifying the data blocks associated with the file; and
in response to a determination that a given data block is in both a baseline backup image and an incremental backup image, restoring the given data block from the incremental backup image without restoring the given data block from the baseline backup image.

20. A computer-implemented method comprising:
receiving a request to restore a file from a backup image generated on a system having a first file system type, the backup image including a plurality of data blocks and a plurality of metadata blocks, each metadata block pointing to a corresponding one of the data blocks and describing attributes of the corresponding data block, the first file system type having the data blocks and the metadata blocks intermixed in the backup image and organized independently of when the backup image was generated;
in response to the request, retrieving the metadata blocks associated with the file and the data blocks that are pointed to by the retrieved metadata blocks to restore the file; and
restoring the file on a system with a second file system type independent of, and different from, the first file system type, wherein the second file system type has a different data layout and format than the first file system type, the second file system type having the data blocks stored in a different section of the backup image from the metadata blocks.

21. The method of claim 20, further comprising:
restoring an entire image of the volume according to the first file system type.

* * * * *